United States Patent
Chafle et al.

(10) Patent No.: US 10,140,171 B2
(45) Date of Patent: Nov. 27, 2018

(54) METHOD AND APPARATUS FOR DOWNSIZING THE DIAGNOSIS SCOPE FOR CHANGE-INDUCING ERRORS

(71) Applicant: International Business Machines Corporation, Armonk, NY (US)

(72) Inventors: Girish B. Chafle, New Dehli (IN); Fan Jing Meng, Beijing (CN); Jing Min Xu, Beijing (CN); Lin Y Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 15/098,700

(22) Filed: Apr. 14, 2016

(65) Prior Publication Data

US 2017/0300370 A1    Oct. 19, 2017

(51) Int. Cl.
  *G06F 11/00* (2006.01)
  *G06F 11/07* (2006.01)
  *G06F 17/30* (2006.01)

(52) U.S. Cl.
  CPC ...... *G06F 11/0781* (2013.01); *G06F 11/0778* (2013.01); *G06F 17/30303* (2013.01); *G06F 17/30368* (2013.01); *G06F 17/30377* (2013.01)

(58) Field of Classification Search
  CPC ............... G06F 11/079; G06F 11/0706; G06F 11/0781; G06F 17/30303; G06F 17/30368
  See application file for complete search history.

(56) References Cited

U.S. PATENT DOCUMENTS

| 7,158,985 | B1* | 1/2007 | Liskov ................. G06F 11/2097 |
| 7,337,092 | B2 | 2/2008 | Yuan et al. | |
| 7,890,551 | B2* | 2/2011 | Benelisha .......... G06F 17/30106 |
| | | | | 707/821 |
| 8,260,871 | B2 | 9/2012 | Fallen et al. | |
| 8,892,959 | B2 | 11/2014 | Fleming et al. | |
| 9,524,475 | B1* | 12/2016 | Cmielowski ......... G06N 99/005 |

(Continued)

OTHER PUBLICATIONS

Meng et al.; "A Generic Framework for Application Confirguration Discovery with Pluggable Knowledge"; Cloud Computing (Cloud), 2013 IEEE Sixth International Conference on, Jun. 28, 2013-Jul. 3, 2013, pp. 236-243.

*Primary Examiner* — Philip Guyton
(74) *Attorney, Agent, or Firm* — W&C IP; Vazken Alexanian

(57) ABSTRACT

The scope of the system changes to be considered for analysis for finding problematic changes is reduced in order to allow focusing on highly potential suspicious drifts caused by change sequences. The method and system includes a data cleaning module to remove irrelevant changes, a feature extraction and normalization module to extract the features of change objects, data annotation module to remove irrelevant changes based on patterns, and a clustering module to obtain groups for further analysis. Data cleaning is simplified using domain independent rules. Additional sources of change sequences are removed by application of pattern based techniques so as to narrow down problematic system changes to analyze for root cause analysis. Change error sequence and degree of temporal correlation to correlate system changes with errors, as well as change behavior patterns may be used for downsizing the diagnosis scope.

20 Claims, 16 Drawing Sheets

(56) References Cited

U.S. PATENT DOCUMENTS

| | | | | |
|---|---|---|---|---|
| 2002/0107837 | A1* | 8/2002 | Osborne | G06F 11/1471 |
| 2004/0139082 | A1* | 7/2004 | Knauerhase | G06F 17/3089 |
| 2008/0104146 | A1* | 5/2008 | Schwaab | G06F 11/1451 |
| 2011/0047414 | A1* | 2/2011 | Kudo | G06F 11/079 |
| | | | | 714/37 |
| 2013/0179560 | A1* | 7/2013 | Kumar | G06F 11/302 |
| | | | | 709/224 |
| 2014/0047202 | A1* | 2/2014 | Vellore | G06F 11/1453 |
| | | | | 711/162 |
| 2014/0059388 | A1 | 2/2014 | Patiev et al. | |
| 2016/0246662 | A1* | 8/2016 | Meng | G06F 11/079 |
| 2016/0292065 | A1* | 10/2016 | Thangamani | G06F 8/65 |

\* cited by examiner

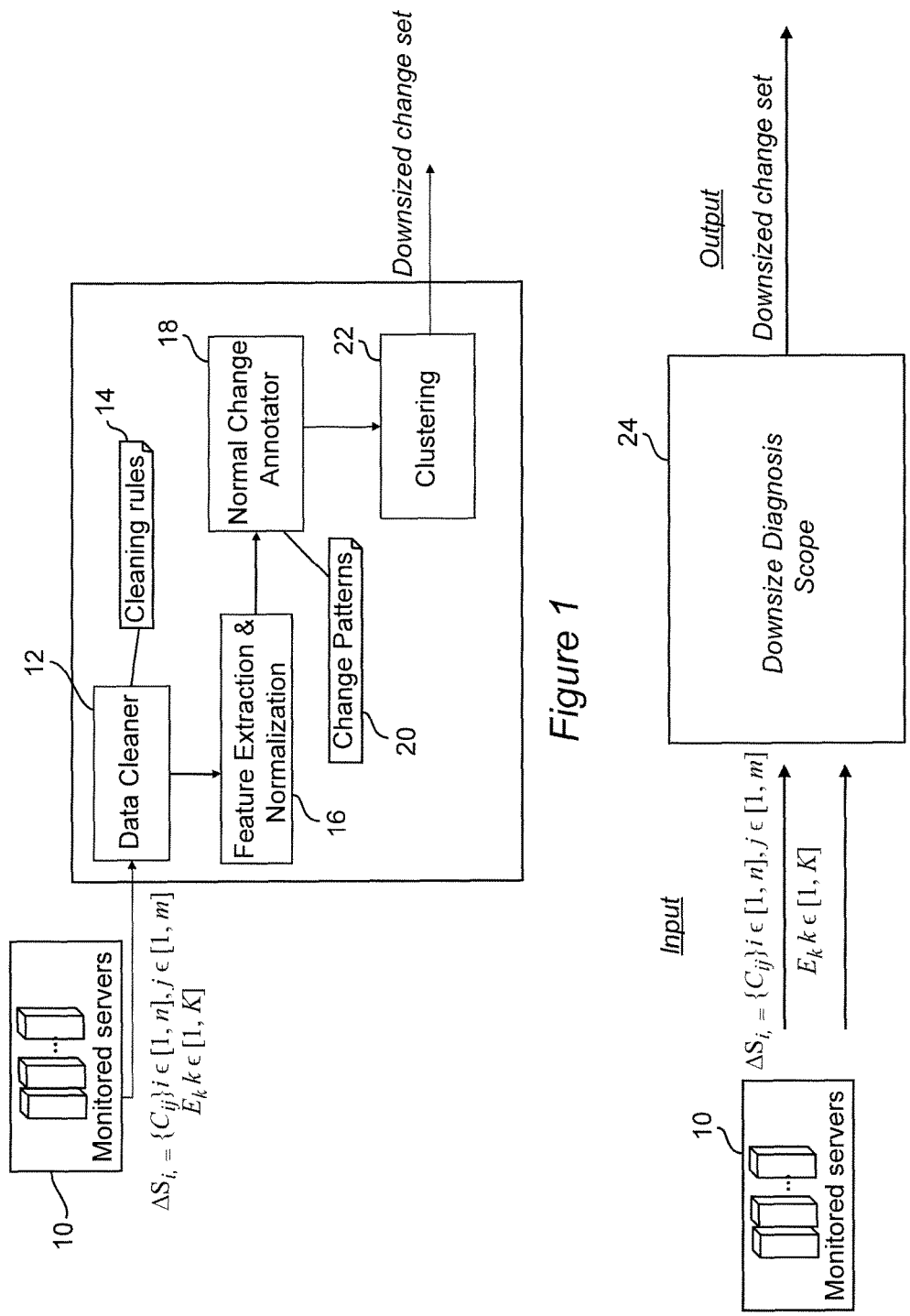

Illustrative Sample - Feature Extraction

System Change

| Timestamp | Object-type | Object-name |
|---|---|---|
| 07/31/14 06:00:05 | File | /lib/libcplex101.so |

Object-metadata-MIME-type: application/octet-stream
Change-behavior: update_meta Changed-attribute | Pre-value | Post-value
{"permission" : "755" | "644", "ctime" : "1403857421" | "1406786206"}

System Objects

Object-name: /POT_Config/database.xml
Object-type: File
Object-metadata-MIME-type: application/octet-stream

| CF | CD | DE |
|---|---|---|
| 0.23076923 | 1.0769231 | 0.01428571 |

Change_sequence: (U,M,A)
Change_error_sequence: (U,M,A,E)

Object-name: /home/db2inst1/sqllib/hmonCache/db2inst1/0/hist/1.hir
Object-type: File
Object-metadata-MIME-type: application/octet-stream

| CF | CD | DE |
|---|---|---|
| 1 | 1.5 | 0.01 |

Change_sequence: (U,M, U,M, U,M, U,M, U,M, U,M, U,M, U,M)
Change_error_sequence: (U,M, U,M, U,M, U,M, U,M, U,M, U,M, U,M, E)

| NO | Change Sequence Pattern | Change Frequency (CF) | Change Density (CD) | isDrift | Action | Change Reason | Examples |
|---|---|---|---|---|---|---|---|
| 1 | (C) | Low | High | No | Clean | Add a new file | File /usr/share/doc/vsftpd-2.0.5/EXAMPLE/README (C) |
|  |  |  |  |  |  | add a new network service or connection | Connection -ltcp|9.186.107.128:80| 9.186.52.180:52475 (C) |
|  |  |  |  |  |  | start a process | Process 32610 /opt/BESClient/bin/BESClient -RPMHelper (C) |
|  |  |  |  |  |  | install a package | Package vsftpd (C) |
| 2 | (C[A]) | Low | High|Medium|low | No | Clean | Create and Access file | File /usr/sbin/vsftpd (C,A) |
| 3 | (C[UM][A]) | Low | High|Medium|low | Suspicious | Correlate with Error and evaluate CF, CD, DE | Install and config the vsftp and start the service | File /etc/vsftpd/vsftpd.conf (C,U,M,A) |
|  |  | High | High | No | Clean | Create and modify file | File /root/data/io.txt (C,U,M,U,M,U,M) |
| 4 | (UM[A]) | High | High | No | Clean | Frequently modify an existing file content e.g. log, cache, temp | File /home/db2inst1/db2inst1/NODE0000/SQL00001/SQLOGDIR/S0000000.LOG (U,M,A,A,A,A,A,A,A,A,A,A)<br>File /home/db2inst1/sqllib/hmonCache/db2inst1/0/hist/ITPO/1016.hir |
|  |  | Medium|Low | High|Medium|low | Suspicious | Correlate with Error and evaluate CF, CD, DE | Modify configurations | File /POT_Config/database.xml (U,M,A,A) |
| 6 | (D) | Low | High | Suspicious | Correlate with Error and evaluate CF, CD, DE | Delete files | Process 6001 /usr/sbin/vsftpd /etc/vsftpd/vsftpd.conf (D) |
| 7 | (P) | Low | High | Suspicious | Correlate with Error and evaluate CF, CD, DE | Change Permissions | File /lib/libcplex101.so (P) |

*Figure 7B*

| Change Pattern | Change Behavior | isDrift | Number of File Changes | Number of Connection Changes | Number of Process Changes | Number of Package Changes | Number of OS Changes | Number of FileSystem Changes | Number of Changes | Cleaned Ratio |
|---|---|---|---|---|---|---|---|---|---|---|
| Create objects | {C} | No | 138 | 25075 | 64 | 2 | 0 | 0 | 25279 | |
| Access files | {A} | No | 73 | | | | | | 73 | |
| Update file meta time | {M} | No | 245 | | | | | | 245 | |
| Update existing objects | {U} | Suspicious | 241 | 29 | 183 | | | 20 | 473 | |
| Update permission | {P} | Suspicious | 0 | | | | | | 0 | |
| Delete existing objects | {D} | Suspicious | 0 | 0 | 62 | 0 | 0 | 0 | 62 | |
| Cleaned | | | 456 | 25075 | 64 | 2 | 0 | 0 | 25597 | |
| Suspicious | | | 241 | 29 | 245 | 0 | 0 | 20 | 535 | 97.95% |
| Total | | | 697 | 25104 | 309 | 2 | 0 | 20 | 26132 | |

*Figure 8A*

| No | Change Sequence Pattern | Change Frequency (CF) | Change Density (CD) | isDrift | Number of File Changes | Number of Connection Changes | Number of Process Changes | Number of Package Changes | Number of OS Changes | Number of FileSystem Changes | Number of Changes | Cleaned Ratio |
|---|---|---|---|---|---|---|---|---|---|---|---|---|
| 1 | (C) | Low | High | No | 136 | 25075 | 64 | 2 | 0 | 0 | 25277 | |
| 2 | (C[A]) | Low | High\|Medium\|low | No | 0 | | | | | | 0 | |
| 3 | (C[UM[A]]) | Low | High\|Medium\|low | Suspicious | 16 | | | | | | 16 | |
| | | High | High | No | 538 | 29 | 151 | | | 20 | 738 | |
| 4 | (UM[A]) | Medium\|Low | High\|Medium\|low | Suspicious | 7 | | 32 | | | | 39 | |
| 5 | (D) | Low | High | Suspicious | 0 | | 62 | | | | 62 | |
| 6 | (P) | Low | High | Suspicious | 0 | | | | | | | |
| | Cleaned | | | | 674 | 25104 | 215 | 2 | 0 | 20 | 26015 | |
| | Suspicious | | | | 23 | 0 | 94 | 0 | 0 | 0 | 117 | 99.55% |
| | Total | | | | 697 | 25104 | 309 | 2 | 0 | 20 | 26132 | |

*Figure 8B*

-File(2)
 + Cluster 1: /etc/*(10)
 - Cluster 2: /POT_Config/*(1)
  - 10/22/14 08:41:52:809 File /POT_Config/database.xml text/plain update_content 1413966852 {"OldContent":"<?xml version=\"1.0\" encoding=\"UTF-8\"?>\n\t<RPO>\n\t<database>\n\t\t<driver>com.ibm.db2.jcc.DB2Driver</driver>\n\t\t<protocol>jdbc:db2:\/\/</protocol>\n\t\t<dbhost>9.186.1 07.130</dbhost>\n\t\t<dbname>ITPO</dbname>\n\t\t<dbuser>mip</dbuser>\n\t\t<passwd>6789tyui</passwd>\n\t\t<port>50000</port>\n\ t\t<lgfile>\/var\/log\/POT\/sda.err.log</lgfile>\n\t\t<maxRetry>70</maxRetry>\n\t</database>\n </RPO>\n\n","NewContent":"<?xml version=\"1.0\" encoding=\"UTF-8\"?>\n\t<RPO>\n\t<database>\n\t\t<driver>com.ibm.db2.jcc.DB2Driver</driver>\n\t\t<protocol>jdbc:db2:\/\/</protocol>\n\t\t<dbhost>9.186.1 07.130</dbhost>\n\t\t<dbname>ITPO</dbname>\n\t\t<dbuser>mip</dbuser>\n\t\t<passwd>6789tyui</passwd>\n\t\t<port>50000</port>\n\t\t <lgfile>\/var\/log\/POT\/sda.err.log</lgfile>\n\t\t<maxRetry>70</maxRetry>\n\t</database>\n </RPO>\n\n"}
+Network(3)
+Process(2)
+File System (0)
+Package(1)
+OS Config(0)

METHOD AND APPARATUS FOR DOWNSIZING THE DIAGNOSIS SCOPE FOR CHANGE-INDUCING ERRORS

BACKGROUND OF THE INVENTION

Field of the Invention

The present invention generally relates to diagnosing computer system failures, particularly those having large economic effects. More particularly, the invention pertains to systems and methodologies for identifying the source of such failures in the changes over time of the state of the failed computer system.

Background Description

Modern computer systems are a work in progress. Configuration changes are a normal part of the maintenance of such systems. The system starts in a "desired state" and the managers of the system either seek a "more desired state" or to remain in the "desired state". The system changes its states over time due to daily execution, maintenances, and updates. Some changes evolve the system to a better state, but sometimes these changes have effects that are unanticipated and undesirable. The problem is complicated because change strategies of this kind are applied—often independently—to the system and its various applications.

System/application (sys/app) failure is prevalent. Well known systems including Microsoft Azure, Amazon.com, Amazon EC2, Facebook, Twitter, and others have experienced outages which affected millions of their customers. Every sys/app failure has a cost. For example, it was reported that Amazon lost over $66K per minute for a website outage. In January of 2011 it was reported that a significant fraction of Google servers went down, all because of a configuration change. It has been reported that configuration format or value errors and inconsistencies, software incompatibilities, problematic patches, unauthorized file or directory accesses and other misconfigurations of systems and applications are the primary reasons for application and service level performance issues and outages.

The volume of configuration changes is enormous. WebSphere Application Server V8.5 has almost a thousand configuration files and its administration and configuration guide is more than a thousand pages long. Oracle's DBMS has over two hundred initialization parameters and about fifteen hundred tables of system parameters, along with an Administrator's Guide in excess of eight hundred pages. In an experiment we observed over ten thousand changes per hour per server. These changes happened at different levels, requiring domain knowledge to analyze them, including operating system changes (hostname, IP, FQHN, kernel upgrade, patches), package changes (installation, configuration, uninstalls, upgrades), middleware and application changes (configurations, patches, services), and network connection changes (services start/stop, connection established/stop).

Existing approaches to identifying and resolving the misconfiguration sources of application and service level performance issues and outages fall into two categories. First is simple trial and error. Working with system logs and traces, an administrator tries to identify the root causes based on their experience with symptoms. The second category of approaches is to use a tool as an assistant. Tools such as Splunk, Evolven, and TripWire allow the administrator to specify rules for monitoring configuration items such as file and directory changes. However, both these approaches have deficiencies. The trial and error approach is highly dependent upon the human experience and knowledge of the administrator. The tool assistant approach is a challenge because it's very difficult to specify all the rules, as became clear in the Google failure case mentioned above.

What is needed is a different kind of approach, one that directly addresses the huge amount of data involved in these configuration complexities.

U.S. Pat. No. 8,260,871 to Fallen describes a system to collect the right set of diagnosis data (e.g., trace data, diagnostic dumps, run reports, logs, etc.) to the errors from a product or system site to be communicated to a diagnosis site. This is purportedly done by collecting the data of the incident and related incidents based on the same problem identification (ID). Fallen is not related to narrowing down the diagnosis scope.

U.S. Pat. No. 7,337,092 to Yuan describes a system to identify the cause of a problem by comparing a trace of events preceding occurrence of the problem with previously diagnosed traces. The focus is to identify problems by looking at the cause of similar known problems. Yuan is not related to narrowing down the diagnosis scope of changes data.

U.S. Pat. No. 8,892,959 to Fleming describes a system and method to identify the root cause of a known problem by linking predefined symptoms (e.g., log data) and root causes (e.g., code set) in a knowledge base. Fleming is not related to narrowing down the diagnosis scope of changes data.

U.S. Patent No. Publication 2014/0059388 to Patiev describes a diagnostic data collection system to facilitate diagnosis of technical problems associated with computing devices. In Patiev, data is collected automatically from the computing device when the user, for example, accesses a help desk and/or call center. The data collected includes among other things, time of error, ip address, error code, results of a trace route between the server and the computing device, and data/logs related to the error. A subset of data, based on the diagnostic request, is transferred to a technical support system. Patiev does not discuss downsizing or reducing the data gather for subsequent analysis, i.e., Patiev is unrelated to narrowing down the diagnosis scope of changes data.

SUMMARY OF THE INVENTION

The invention provides a pattern based method and apparatus to narrow down the scope of diagnosis, doing so with a focus on changes data where narrowing down is achieved with domain-independent rules and patterns.

The steps of the method are:

Step 1: clean the irrelevant changes based on the domain independent rules (e.g. log files, temporary files, cache files);

Step 2: extract and normalize the features (e.g. change frequencies, change sequences) of change records and objects from a set of huge system change records;

Step 3: remove the normal changes based on the change patterns (e.g. add a new file, access a file, highly frequently changed objects) based on extracted and normalized features;

Step 4: cluster the rest change records into smaller clusters for further investigation.

Elements of the invention include: a data cleaning module to remove irrelevant changes based on the domain independent rules (e.g. log files, temporary files, cache files); a feature extraction and normalization module to extract from the huge volume of system change records features (e.g. change frequencies, change sequences) that are characteristic of change objects for the volume as a whole; a data annotation module to remove irrelevant changes based on the change patterns (e.g. add a new file, access a file, highly frequently changed objects); and a data clustering module to cluster the remaining changes into smaller groups for further investigation.

To give an example which illustrates the utility of the invention, application of rules reduced almost 44 thousand raw change data instances to just over 26 thousand instances, a reduction of 40%.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a diagram which includes the system components and which implements the pattern-based method of the present invention to narrow down diagnosis scope;

FIG. 2 is a diagram which reduces the system and process of the invention depicted in FIG. 1 to illustrate the reduction of the massive amount of change data collected during a time interval a system to a downsized change set useful for problem diagnosis;

FIG. 5 is an illustration of an exemplary feature extraction according to the invention;

FIGS. 7A and 7B are tables showing the application of data cleaning and feature extraction and normalization respectively to various change behavior pattern examples and various change sequence pattern examples;

FIGS. 8A and 8B are tables showing annotation of change behavior patterns and change sequence patterns, such as those presented in FIGS. 7A and 7B;

FIG. 9 is an illustration showing clustering of remaining change sequences, after the initial change sequence data set is reduced by cleaning according to FIG. 4 and additional change sequences are removed from consideration using feature extraction and normalization;

FIG. 16 is a screen showing a deep dive into the details of the drift.

DETAILED DESCRIPTION

Figure 3:
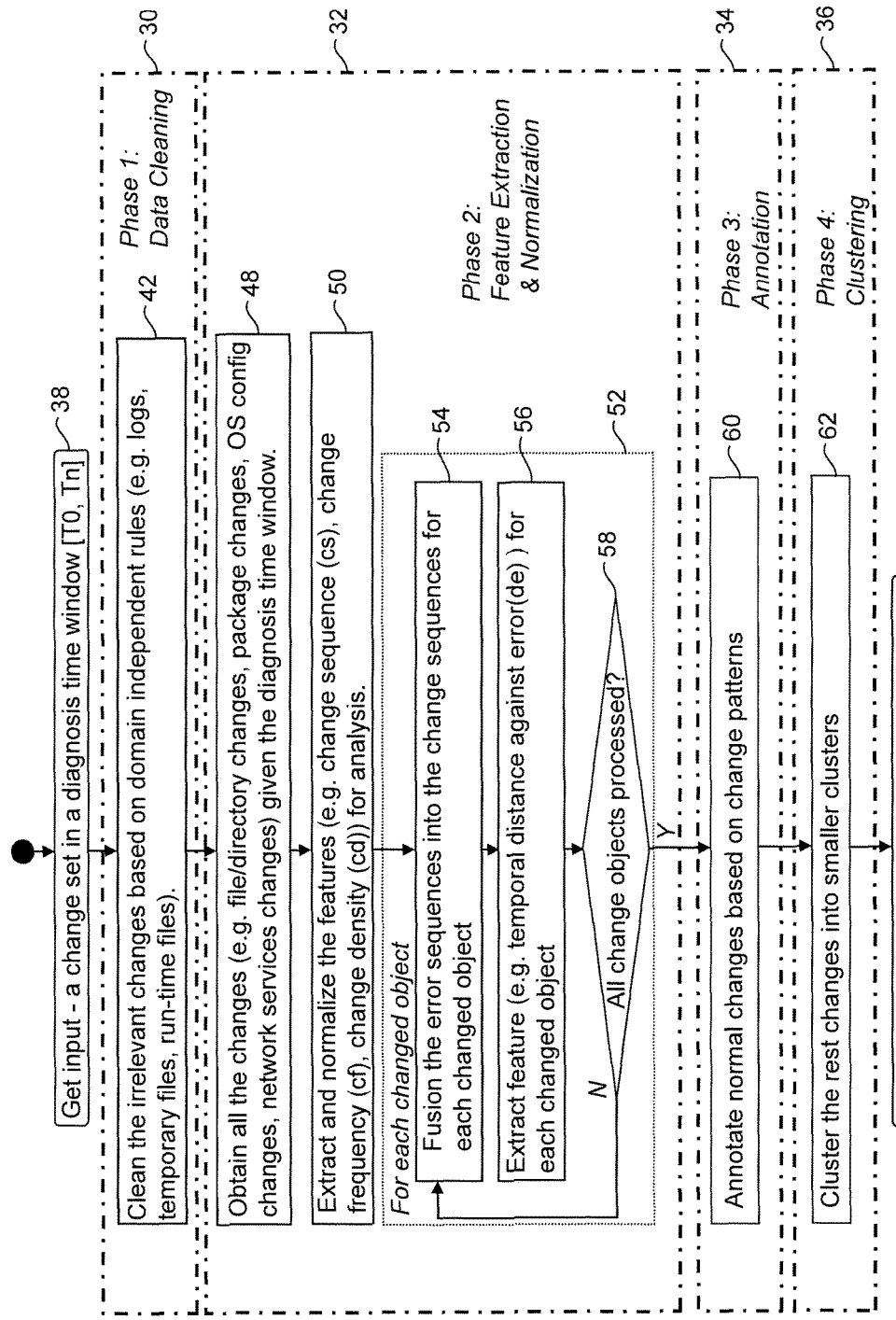
FIG. 3 is a flow chart showing the process of the invention in more detail.

The invention pertains to a method and system for reducing the scope of the system changes to analyze for finding problematic changes. The method and system includes a data cleaning module to remove irrelevant changes, a feature extraction and normalization module to extract the features of change objects, data annotation module to remove irrelevant changes based on patterns, and a clustering module to obtain groups for further analysis. Some of the new features contemplated by the invention include but are not limited to:

Use of domain independent rules for data cleaning;

Application of pattern based techniques to narrow down problematic system changes to analyze for root cause analysis;

Use of change error sequence and degree of temporal correlation to correlate system changes with errors; and Use of change behavior pattern for downsizing the diagnosis scope.

FIG. 1 shows input of change data from one or more servers 10. As will be discussed below, this change data is obtained for a diagnosis time window (T0, Tn). Depending on the system, there can be a variety of change data that can lead to configuration and system state drifts. For example, static state change may result from changes to configuration and system files, operating system (OS) configuration changes, package changes, etc., and dynamic state changes may result from process changes, changes to network services, changes to file systems, etc. The types of change inducing behavior can be wide ranging. Examples of major types of change behavior include but are not limited to: D-Delete; C-Create, U-update (update content of a file), A-Access a file; M-update the meta data of a file; and P-Update the permission of a file.

The inputted change data is acted on by a data cleaner 12 (e.g., a data cleaning module) to remove irrelevant changes (i.e., those which would not impact the operation of the system and lead to system errors, e.g., log files, temporary files, cache files, etc.) from the data set. This is accomplished using domain independent rules 14. Examples of domain independent cleaning rules include but are not limited to:

```
^/boot/.*
^/dev/.*
^/proc /.*
^/sys /.*
^/mnt /.*
^/tmp/.*|.*/wstemp/.*|.*/temp/.*
^/var/spool/.*
.*\.log$|^/var/log/.*|.*/logs/.*|.*\.pak$
.*\.class$|^/var/cache/.*|^/var/run/.*
```

A device, system or module for feature extraction & normalization 16 is then used to extract features (e.g., change frequencies, change sequences, etc.) of change objects from the system of change records (which can be a relatively huge system of change records). Examples of "features" which can be extracted and normalized may be change objects, change behaviors, and change characteristics.

Examples of a change object include but are not limited to:

Object-type: e.g. file/directory, package, network services/connections

Object-metadata: e.g. "name", "path", "MIME-type", "size", "ctime", "mtime", "atime", "permission", and etc. for a file.

Examples of a change behavior include but are not limited to:

Change-time: e.g. 07/31/14 06:00:05
Change-type: e.g. "create", "delete", "update", "update_meta";
Change-content: e.g. "OldContent":" . . . ", "New Content":" . . . "
Change-attribute: e.g. "permission"
Pre-value: e.g. "755"
Post-value: e.g. "644"

Examples of a change characteristic include but are not limited to:
Change-sequence: e.g. (U,M,U,M,U,M), (P)
Change-frequency(CF): e.g. 0.01342, 1.2209
Change-density(CD): e.g. 0.5294, 2.4951
Change-error_sequence: e.g. (U,M,A,E)
Distance_to_error(DE): e.g. 0.4

During frequency extraction and normalization 16 there may also be more extraction of features, refining of diagnosis windows, comparison to change patterns 20, as discussed below.

After feature extraction, a normal change annotator 18 or data annotation module is used to annotate the data set to remove irrelevant changes based on the change patterns. Examples of irrelevant changes include but are not limited to adding a new file, accessing a file, frequently changed objects, etc. A data clustering module 22 clusters the rest of the changes into smaller clusters for further investigation. The result is a significantly downsized change set is produced for analysis.

FIG. 2 highlights the result of the system and method of the claimed invention is to take the massive change set for a servers 10 being monitored, and to downsize the diagnosis scope using the system and method 24 of the present invention, to provide automatically as output a significantly downsized change set for analysis and problem diagnosis.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
FIG. 4 is a diagram illustrating a reducing of change data from raw change data input to cleaned changes for further processing according to the invention.

FIG. 3 illustrates the method of this invention has four phases: data cleaning 30, feature extraction and normalization 32, annotation 34, and clustering 36. The method obtains a change set in a diagnosis time window (T0, Tn) as input 38 from one or more servers, and provides as output 40, a significantly downsized change set which can be more easily analyzed for problem diagnosis. The first phase 30 cleans the irrelevant changes from the inputted change set based on domain independent rules 42. For example, logs, temporary files, and run time files, for example, can be flagged as producing irrelevant changes that do not require further analysis. FIG. 4 shows by example that the raw change data 44 can be significantly reduced to a set of cleaned changes 46 using domain independent rules 42.

Figure 6:
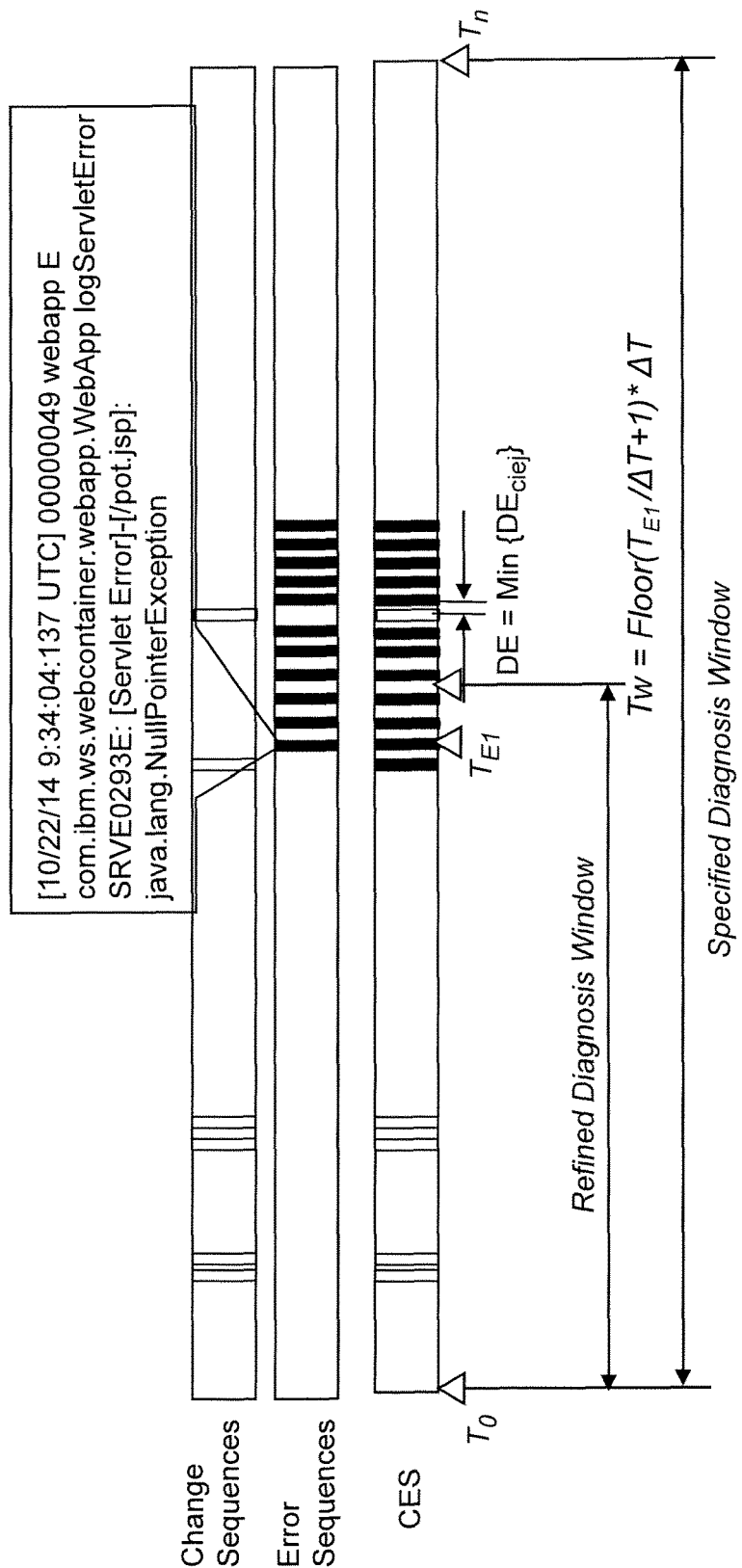
FIG. 6 is a diagram showing extraction of the temporal distance against error (de) in an exemplary process for refine the diagnosis window in a way which enables removing changes outside specified distances.

Feature extraction and normalization 32 can be performed in a number of ways. On example is to obtain all the changes, from the cleaned changes 46, which occur in the diagnosis time window 48. This would include, for example, file/directory changes, package changes, OS configuration changes, network service changes, etc. Then, the features are extracted and normalized for analysis 50. For example, the extraction would categorize the changes as change sequences (CS), change frequency (CF), change density (CD), etc. FIG. 5 shows an example of a feature extraction from an exemplary set of cleaned change data wherein various features are extracted for system changes and system objects. With reference back to FIG. 3, in a process for all the change objects 52, there would be a fusion of the error sequences into the change sequences for each changed object 54, and an extraction feature for each changed object 56, until all change objects were processed 58. The extract feature could, for example, consider the temporal distance against error (DE). FIG. 6 shows an example of refining the diagnosis window which may be employed in extraction and normalization. Considering the change-error sequence (CES) as a combination or fusion of change sequences and error sequences for each suspicious change, the distance with errors (DE) is calculated in order to evaluate the degree of temporal correlation. In this way, for a specified diagnosis window (T0, Tn), a refined diagnosis window (T0, Tw) can be identified based on a calculated DE. Using the refined diagnosis window (T0, Tw), changes outside the window can be eliminated, further simplifying error diagnosis.

Figure 7A:
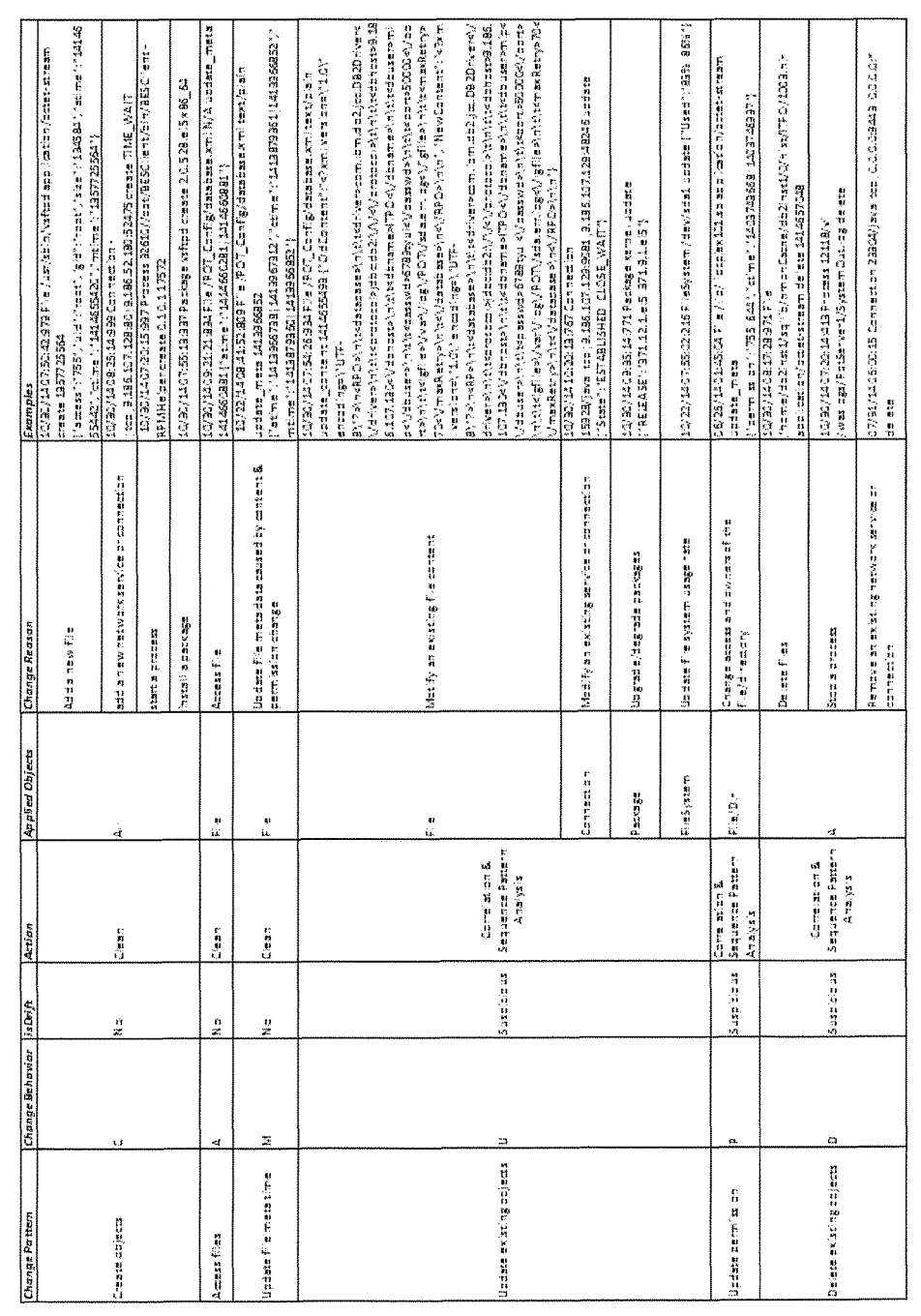

FIGS. 7A and 7B are tables showing the application of data cleaning and feature extraction and normalization respectively to various change behavior pattern examples and various change sequence pattern examples as contemplated by the data cleaning 30 and feature extraction and normalization 32 phases of FIG. 3 of the application. As can be seen from FIG. 7A, various change behavior patterns, such as the creation of objects, accessing of files, and updating of file meta time, each of which may be the source of change sequences in the initial large set of change data provided from the servers for the analysis time, are simply "cleaned", i.e., removed from the data set according to domain independent rules as shown by example in FIG. 4 of the application. By contrast, various other actions such as updating existing objects, updating permissions, and deleting existing objects, which lead to change sequences, are identified as being "suspicious", and require further analysis for as possible sources of problems for diagnosing a system problem. These "suspicious" sources of change sequences may be subjected to correlation and sequence pattern analysis or other types of analysis. Similarly, FIG. 7B shows various change sequence patterns being cleaned or identified as being "suspicious" and requiring further analysis according to phase 1, data cleaning 30, and phase 2, feature extraction and normalization 32, as illustrated in FIG. 3. Operations such as C-Create, A-accessing a file might ordinarily be viewed (i.e., determined by some embodiments of the system and method of the invention) as not leading to change sequences which need to be considered for problem diagnosis, while other operations such as D-Delete, and P-change permissions may be viewed as possibly leading to change sequences which should be considered for problem diagnosis. However, the context of the operation may suggest alternative decisions on whether or not further analysis is required. For example, in some situations updating metadata and accessing files would be viewed as not likely to lead to a problematic change sequence (one which would need to be analyzed for problem diagnosis), but in other situations the same change sequence patterns may be viewed as "suspicious". As with FIG. 7A, FIG. 7B shows that a number of change sequence patterns can simply be eliminated from the initial data set by a cleaning operation, and that the remaining change sequences may be further analyzed, e.g., by correlating the error with other errors, and/or by evaluating the change frequency (CF), change density (CD), and/or distance against error (DE).

FIGS. 8A and 8B show that the change behavior patterns and change sequence patterns can be automatically annotated so as to permit focusing on high potential suspicious drifts. For example, in FIG. 8A, out of 26,132 change behavior patterns in the raw change data provided for the diagnosis interval (T0, Tn), only 535 change sequences are identified as being suspicious and requiring further analysis. Similarly, in FIG. 8B, only 117 change sequences patterns are identified as being suspicious and requiring further analysis. FIG. 3 shows that in the annotation phase 3, the system and method may annotate normal changes based on change patterns 60. The result, as shown in FIGS. 8A and 8B is that the enormously large data set of all sources of change sequences which may have occurred and given rise to the problem to be diagnosed, the technician (and/or an automated problem analysis tool) is provided with a set of change sequence data that is substantially reduced so that diagnosis efforts can be concentrated on the most likely sources of change inducing errors.

For efficiency, as shown in FIG. 9, these remaining change sequences can be clustered into smaller clusters (see also FIG. 3 at the fourth phase 36 where the rest of the change sequences are clustered into smaller clusters 62). From FIG. 9, it can be seen that the remaining sequences can be divided into clusters to allow an efficient mechanism to ultimately diagnose the system problem.

EXAMPLE

As an example application of the invention, an embodiment of the invention is described herein in terms of change tracking and abnormal change detection for cloud based systems trouble shooting.

Abstract—The speed and agility of Cloud based systems challenge the traditional way of IT configuration and change management. Organizations have to find new ways to nimbly cope with the system problems incurred by the changes that are continuously deployed to the systems in an ever faster pace. This paper presents a novel approach that tracks fine-grained, system level changes and detects suspicious ones for accelerating system troubleshooting. The changes are captured from the major aspects of the targeted system across all levels of software stack using either in-VM or out-of-box manner. A pattern based drift analysis approach is then used to filter irrelevant or less suspicious changes out of the potentially large amount of collected data, correlate the remaining changes with the reported errors in multiple dimensions, and finally discover and rank the suspicious changes. A tool was implemented based on the commercial product IBM® Operations Analytics-Log Analytics (IOA-LA) and experimented with common change-induced faults injected into a typical cloud based application system. The experimentation results are very positive and demonstrated the effectiveness and efficiency of our approach.

INTRODUCTION

Cloud computing disrupts the traditional way of IT service management with extreme automation and workload agility. The gap between development and operation is bridged so that smaller changes can be continuously deployed to production systems with little or no technical friction. Organizations' change management processes have to be adapted for working in concert with continuous delivery in order to exploit the agility while controlling risks. However, finding a new balance between control and agility for an organization is very challenging because it's always hard to decide what level of human oversight for changes needs to be in place.

The notion of "small and frequent changes" fostered by continuous delivery mitigates the administrative worries about full automation with the assumption that smaller change sets are less likely to cause problems and easier to rollback when they do. Therefore some organizations focus their change management efforts on an efficient rollback procedure, e.g. blue-green deployment [1] or its variants, which kicks in immediately and automatically when changes fail.

The modern configuration management tools adopting the paradigm of "Infrastructure as Code" such as CFEngine[2], Chef[3], etc. complement continuous delivery with not only deployment automation, but also self-managing capability that is able to perform idempotent operations, e.g. Chef recipes, to converge the target system to the desired state upon any detected drifts. Nevertheless, organizations exploit much less of its self-managing capability than deployment automation because there are many practical issues caused by the costs and difficulty in developing and maintaining a complete set of idempotent operations [4].

Both blue-green deployment and drift convergence target at quickly restoring business operation for minimizing negative impact of change caused system problems or failures. Organizations are still using the traditional approach to problem determination and troubleshooting, which is usually manual based and very time consuming. The inability to feedback quickly retards continuous delivery pipeline, so organizations need to find a nimble way to cope with the problems in order to catch up the speed demand.

In this Example, we demonstrate our novel approach based on change tracking and abnormal change discovery. The main contributions of this paper are two-fold: we track the changes of the static and dynamic system states in six types using either in-VM or out-of-box manner; we use a pattern-based approach to filter out the irrelevant changes, correlate the remaining changes with the reported errors, and finally discover and rank suspicious changes.

There are a couple of challenges we addressed for making it work. First, we need a very flexible way to capture various kinds of fine-grained system level changes regarding the major aspects of the targeted system including files, processes, network connections, etc. The traditional change management usually assesses the impact of high level, coarse-grained changes, so it may overlook the side effect of fine-grained system level changes that actually reflect the system state drifts as a result of making the high level changes. A very small system level change can unexpectedly cause very severe system problems. For example, a file permission change caused 15-20% Google servers went offline in January, 2011[5]. The change collectors also have to be adaptive to various system environments and customer's security and regulation requirements. Second, the amount of collected change data can be potentially huge even within a time window because fine-grain system level changes can happen very frequently. An application transaction or a system management activity can possibly lead to numerous system level changes. In a diagnosis time window, the overwhelming majority of the changes are irrelevant to the problem being diagnosed. The key challenge is how to filter out the irrelevant changes as many as possible. The diagnosis scope has to be downsized to a reasonable number of suspicious changes that human can handle. Third, the existing configuration and change analysis techniques highly depend on formally defined knowledge e.g. rules, scripts, etc. The high diversity and ever-changing nature of applications and their operation environments make it impractical to timely evolve the knowledge base along with the dynamics.

The rest of this Example is organized as follows. In the related work section, we briefly review the existing work and point out differences for our approach. In the overview section, the workflow and system architecture of our approach. The system design section describes the detailed design of our approach. The evaluation section presents the system implementation and evaluations of the system through fault injection experiments.

Related Work

In a position paper [6], Redstone, et al. described a vision of an automated problem diagnosis system that automatically captures aspects of a computer's state, behavior, and symptoms necessary to characterize the problem, and matches such information against problem reports stored in a structured database. Our approach is to track system level changes and identify suspicious ones based on identified patterns without the assumption of an existing problem database.

STRIDER[7], described a black-box, state based approach for change and configuration management and support. It uses state diff and trace information to characterize the configuration problems. The main challenge addressed is to narrow down the problem to a small subset of state entries based on mechanical and statistic techniques. It assumed a shared, persistent configuration store, e.g. Windows registry, whereas our approach captures configurations changes from files, process, network, storages, etc.

Christopher, et al, described how information derived from other user's activity and the structure of the filesystem hierarchy can be used to detect abnormal access patterns [8]. It only captures files access for its own detection purposes, but the file access history is leveraged to score the risk of the current access. Our approach uses change sequence patterns and change error distance pattern to filter out less suspicious changes and rank the suspicious candidates.

Sahil[9] et al. introduced a non-intrusive, out-of-band and out-of-box system monitoring solution, which extends VM introspection techniques and combines these with a backend Cloud analytics platform to perform monitoring and management functions without requiring access into, or cooperation of the target systems. We developed a change collector following the design notions but the implementation differs in both VM states exposure and VM state exploitation.

Emerging IT Operations Analytics (ITOA) vendors such as Splunk, Evolven, etc. collect actual changes made in the IT environment and correlate the data with context, symptom information collected from various data sources for cross-silo analytics, e.g. detect when files on production hosts differ from master configurations in Configuration Management Database (CMDB) or change control systems. Our approach also leverages system log or monitoring events for determining when the problem actually happens. A broader scope of correlation with other sources is used in our approach.

Overview

In this section, we present an exemplary embodiment of the main workflow of our approach and describe the system architecture.

A. Workflow

Figure 10:
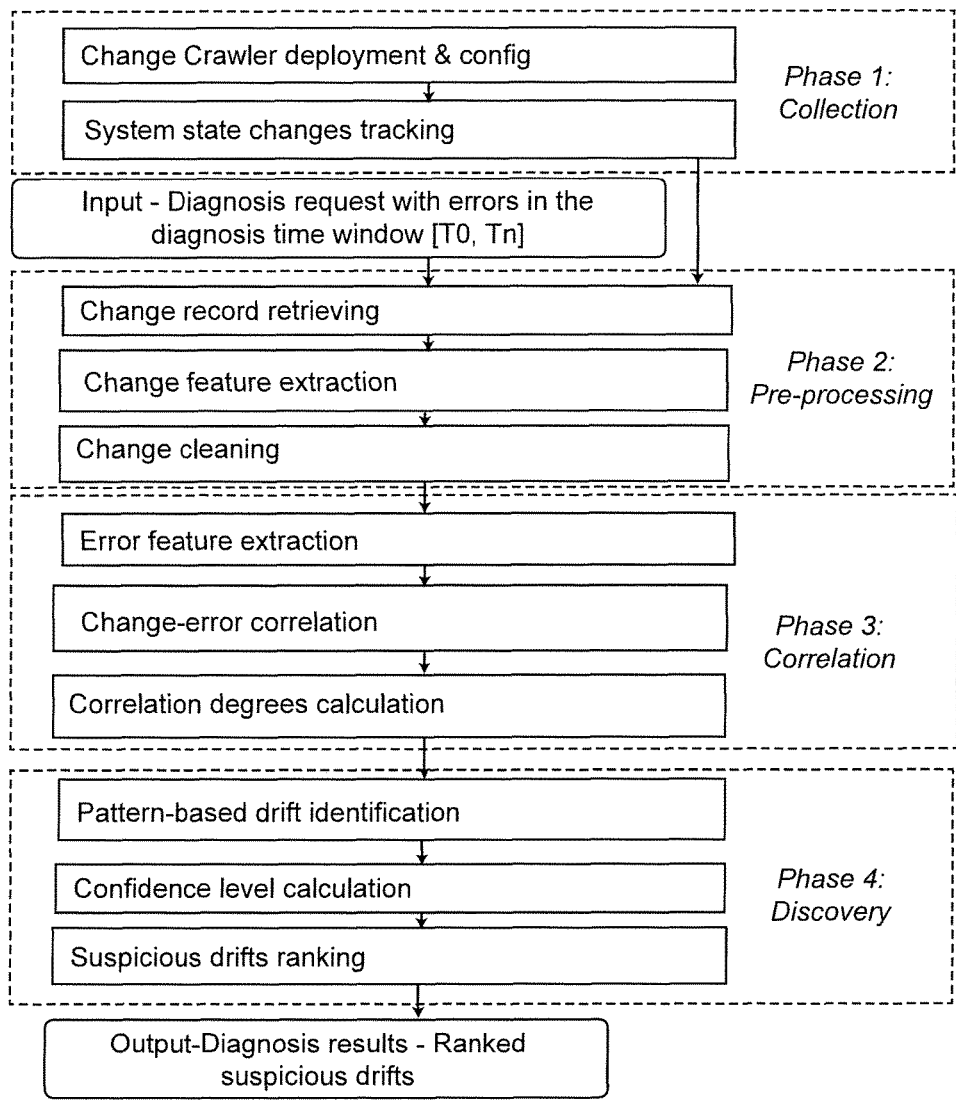
FIG. 10 presents an overview of the main process in an exemplary embodiment of the invention.

In order to discover the abnormal changes which caused issues of the cloud based systems, we design a pattern-based approach to identify the suspicious changes. The main process is shown in FIG. 10.

The workflow includes the four major phases: Collection, Pre-processing, Correlation, Discovery. Phase I Collection traces all the actual changes including the static and dynamic state changes of the targeted system. The static changes are the changes on the files, installed software or packages, and operating system configurations. The dynamic changes include the changes on the running processes, network connection, and resource utilization. All the changes are recorded in the change logs. The Pre-processing phase extracts the features from the change logs and filters the irrelevant changes out of the diagnosis scope. We firstly extract the detailed features from each change record in the change logs and then aggregate the change records by change objects within the given diagnosis time window to extract the features for each change object. Finally, we clean the irrelevant changes based on the domain independent rules or patterns by composing these extracted features. Phase III Correlation correlates each of these cleaned changes with the reported errors from multiple dimensions and extracts the features based on the correlation to measure the correlation degrees of given change on these dimensions. The correlation dimensions include the temporal, spatial, and semantic aspects. In the phase IV Discovery, abnormal changes a.k.a. drifts can be distinguished with the change patterns. For each identified abnormal change, a confidence level is calculated by evaluating the correlation degrees of the change with these errors and characteristics of the change object.

B. System Architecture

Figure 11:
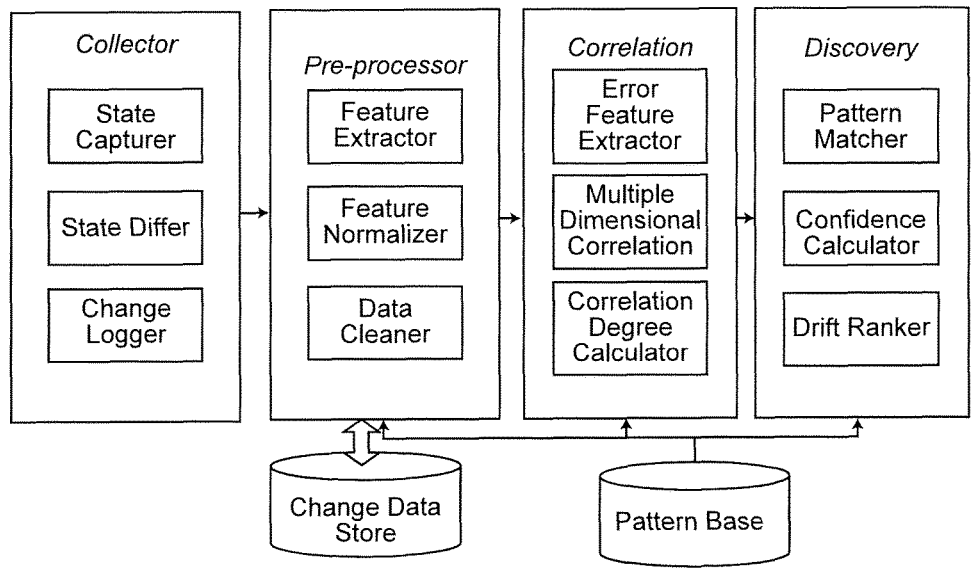
FIG. 11 is a schematic of the system architecture of an exemplary embodiment of the invention.

As shown in FIG. 11, our system contains four major components: Change Collector, Change Pre-Processor, Correlation Analyzer, and Drift Discovery and two databases: Change Data Store and Pattern Base.

The Change Collector captures the actual static and dynamic state changes of monitored system in the In-VM or Out-of-Box mode periodically. It involves three subcomponents: State Capturer, State Differ, and Change Logger. The State Capturer aims to take the snapshots of whole system state periodically. The State Differ compares the current system snapshot with the nearest system snapshot and generates the changes between the two snapshots. The Change Logger takes the output from the State Differ and records them into the change logs. The change capture frequency and data collection scope can be configured according to the workload characteristics and operations requirements.

The Change Pre-processor obtains the change set and extracts the useful information a.k.a. features of each change record from the change logs. In this component, we design three subcomponents: Feature Extractor, Feature Normalizer and Data Cleaner. The goal of the Feature Extractor is to extract the detailed characteristics of change records and prepare for further drift analysis. The Feature Normalizer rationalizes the textual data or data in different scale into normalized value. The Data Cleaner aims to reduce the diagnosis scope into a reasonable size by filtering the irrelevant changes out of the change set.

The Correlation Analyzer component fuses the changes and errors together and measures their correlation degrees from multiple dimensions. It includes three subcomponents: Error Feature Extractor, Multiple Dimensional Correlation, and Correlation Degree Calculator. The Error Feature Extractor extracts the useful error information from the logs in the diagnosis window e.g. the timestamp, host, application, error code, keywords. The Multiple Dimensional Correlation correlates these changes with errors from temporal, spatial, and semantic perspectives. The Correlation Degree Calculator calculates the multiple dimensional correlation degrees for the further drift analysis.

The Drift Analyzer uses patterns to discover the abnormal changes from the downsized, normalized and correlated change records. It includes three subcomponents: Pattern Matcher, Confidence Calculator, and Drift Ranker. The Pattern Matcher matches the patterns in the Pattern Base to identify the normal or abnormal changes. The Confidence Calculator calculates the probability of a change causing the errors based on the normalized change features and change-error correlation degrees. The Drift Ranker orders the suspicious drifts based on the calculated confidence levels.

The Change Data Store persists and indexes all the captured changes. It provides RESTful APIs to allow the clients to query the change data against the data store.

The Pattern Base is the knowledge base to store the normal and abnormal change patterns. These patterns can be defined by the experts or mined from historical data by machine learning algorithms.

System Design

In order to analyze the changes, the features embedded in the change logs are extracted and normalized.

Change Log

The actual changes on the target system are captured by the Change Collector and recorded in the change logs. The change logs specify the details of the change objects and the associated change behaviors. Each change record documents one individual change made on a specific change object and is defined in the following format: [timestamp] [QUID] [hostname] [object type] [object name] [object attribute] [change behavior] [change time] [change details]. For example, a file metadata update change is recorded in the change log with the following change record: "10/22/14 09:17:06:097 File vm129.purescale.net/opt/logstash-1.4.0/shipper.conf text/plain update_meta 1413967544 {"atime": "1413967678|1413969426"}"

Feature Extraction

In order to analyze these change records documented in the change logs, we extract the detailed features from these change records. In general, the features are extracted from two perspectives: change record and change object. As an example we define these features in Error! Reference source not found. For the change record, we simply annotate all the attributes from each change record. These features for a change record include the timestamp, UUID, hostname, object type, object name, object attribute, change behavior, change time, change details. From the change object perspective, we aggregate all the change records for the given change object in the diagnosis window and extract the features to specify the change characteristics of the change object. These features include the change window, change sequence, change frequency, change density.

TABLE I

Features of Change Record and Change Object

| Category | Feature | Description | Example |
|---|---|---|---|
| Change Record | Timestamp | the time that the change is observed | e.g. 10/22/14 09:17:06:097 |
| | UUID | The unique identifier for this change record | e.g. 3b5731b8-1c44-4b01-9a97-3e25fc7c2b0c |
| | Hostname | The host where the change is captured | e.g. vm130.purescale.net |
| | Object type | the type of change object | e.g. File, Process, Connection, OS, Package, Utilization |
| | Object name | The name of the change object | e.g. /opt/logstash-1.4.0/shipper.conf (file), vsftpd(package) |
| | Object attribute | The attribute of the given object which are important for the analysis | e.g. config file, system library file, text file |
| | Change behavior | Specific change type on the object. We use single character to indicate the change behavior | e.g. create(C), update(U), update_content(U) for a file, update_mata(M) for a file, access(A) for a file, update_permission(P) for a file, delete(D) |
| | Change details | The details of the change on the object | {"atime":"1413967678|1413969426"} for file access |
| Change Object | Change window | The time span in millisecond between the last change and the first change of the observed object | e.g. 256723 |
| | Change sequence (cs) | The temporal sequence of change records. We use the single character to indicate each change behavior. | e.g. CUMA, UMUMUMUM, UMA, UMAD, PA |
| | Change frequency (cf) | The frequency of the change object in the given diagnosis time window. It is defined as the number of changes divided by the number of tracking intervals in the diagnosis time window | e.g. 0.2, 0.2342 |
| | Change density (cd) | The relative change frequency in its change window. It is defined as the number of changes divided by the number of tracking intervals in its change window | e.g. 1, 0.5, 0.2342 |

Data Cleaning

Given the huge volume of change data captured at the system level, we designed two types of domain independent mechanisms to remove the irrelevant changes for reducing the scale and complexity of data to be analyzed. First, we apply the domain independent rules to reduce the change set. These rules are specified as the Regular Expressions to scan all the change records. The matched change records are removed from the diagnosis scope. For example, we filter out the temporary and log files with the rule of "^/tmp/.*|.*/temp/.*|.*\.log$|^/var/log/.*|.*/logs/.*". Second, we apply the change behavior patterns and change sequence patterns to further downsize the scale. TABLE II illustrates the examples of these change patterns. The change behavior patterns distinguish the safety change records by the change behavior on the given object type under the defined conditions. The change sequence patterns filter out the irrelevant changes with high frequency of specific sequence patterns on given object type. These two types of patterns have been stored in the Pattern Base and can be added by the experts or learning from historical data.

In the data cleaning phase, the confidence levels of identified irrelevant change records are set to 0 and labelled these applied rules or patterns as the rational to make this understandable by the users, After the data cleaning, the diagnosis scope are dramatically downsized to a reasonable scope for further analysis.

TABLE II

Change Pattern Examples of Data Cleaning

| Pattern Type | Change Behavior | Change Object Type | Condition | Description |
|---|---|---|---|---|
| Change Behavior Pattern | A | File | All | Accessed a file |
| | M | File | All | Modified the meta data e.g. size, ctime, mtime, etc. |
| | C | Package | All | Added a new package |
| | C | Connection | All | Added a new network connection |
| | U | Process | Post-value < Pre-value | Updated the decreasing utilization of processes |
| | U | Connection | Post-value is established | Established a network connection |
| | C | File System | All | Added a new file system |
| Change Sequence Pattern | [UA]+ | File | cf > threshold 1 or cf > threshold 2 & cd > threshold3 | Frequently updated files |

Change-Error Correlation

In order to identify the drift which may cause the symptoms or errors, we correlate the each change object with the errors from three major dimensions, which are the temporal, spatial, and semantic dimensions. Temporal correlation degree (TCD) is defined in Eq(1).

$$TCD_{co_i} := Min(|T_{CR_{ij}} - T_{E_k}|) \quad (1)$$

Where $TCD_{co_i}$ denotes the temporal correlation degree of the change object i ($CO_i$) with these errors, $T_{CR_{ij}}$ is the timestamp of the change record j $CR_{ij}$ of $CO_i$, and $T_{E_k}$ is the timestamp of the first observed error k ($E_k$).

Spatial correlation degree (SpCD) is defined in Eq(2).

$$SpCD_{CO_i} := \begin{cases} Min(Dis(N_{CO_i}, N_{E_k})) & Dis(N_{CO_i}, N_{E_k}) \geq 0 \\ -1 & \text{otherwise} \end{cases} \quad (2)$$

Where $SpCD_{co_i}$ denotes the spatial correlation degree of the $CO_i$ with these errors, Dis ($N_{CO_i}$, $N_{E_k}$) is the distance between the node $N_{CO_i}$ where the $CO_i$ residences, and the node $N_{E_k}$ where the $E_k$ was captured. Semantic correlation degree (SmCD) is defined in Eq(3).

$$SmCD_{co_i} := Max(Sim(CR_{ij}, E_k)) \quad (3)$$

Where $SmCD_{co_i}$ denotes the semantic correlation degree of the $CO_i$ with these errors, $Sim(CR_{ij}, E_k)$ is the semantic similarity of the keywords between the change records j of $CO_i$ and $E_k$.

Drift Discovery

After the change pre-processing and correlation, we then apply the pattern based approach to discover the abnormal changes and calculate their probabilities to be the root cause of the given errors. Examples of these patterns are listed in Error! Reference source not found. The suspicious drifts are identified with these patterns and labelled these pattern description as the hints to assist the diagnosis.

TABLE III

Change Pattern Examples for Drift Detection

| Change Object Type | Change-Error Sequence | Condition | Description |
|---|---|---|---|
| File | [CUA]U(AE)+ | Config File TCD < Change Capture Interval SpCD > 0 SmCD > 0 | Suspicious config file content update |
| File | P(AE)+ | SpCD > 0 SmCD > 0 Permission withdrawal | Suspicious file permission withdrawal |
| OS | [CU]UE+ | SpCD > 0 SmCD > 0 | Suspicious configuration change |
| File, Process, Package, Connection | DE+ | SpCD > 0 SmCD > 0 | Suspicious object deletion |
| Package | UE+ | SpCD > 0 SmCD > 0 | Suspicious package update |
| Process | UE+ | Post-value > moving average (metrics) | Suspicious process resource usage |

TABLE III-continued

Change Pattern Examples for Drift Detection

| Change Object Type | Change-Error Sequence | Condition | Description |
|---|---|---|---|
| Connection | UE+ | SpCD > 0<br>SmCD > 0<br>State = TIME_WAIT | Suspicious network connection state change |

Besides, the confidence level ($C_{D_l}$) of the suspicious drift $D_l$ is defined in the Eq(4). It is calculated based on the weighted average of their extracted features including the importance of the change object, the temporal correlation degree of the change with the errors, the spatial correlation degree of the change with the errors, the semantic correlation degree of the change with the errors.

$$C_{D_l} ::= w_{TCD}{}^*Norm(TCD_{D_l}) + w_{SpCD}{}^*Norm(SpCD_{D_l}) + w_{SmCD}{}^*Norm(SmCD_{D_l}) + w_{obj}{}^*Norm(obj_{D_l}) \quad \text{Eq(4)}$$

Finally, the change objects whose probabilities are over the given thresholds are the suspicious changes which might cause the errors. These suspicious changes are ranked based on the calculated probabilities. The rationale and details of the changes behind the calculation are also presented to the users, which help them understand why these suspicious changes are identified as the potential root cause.

EVALUATION

System Implementation

Figure 12:
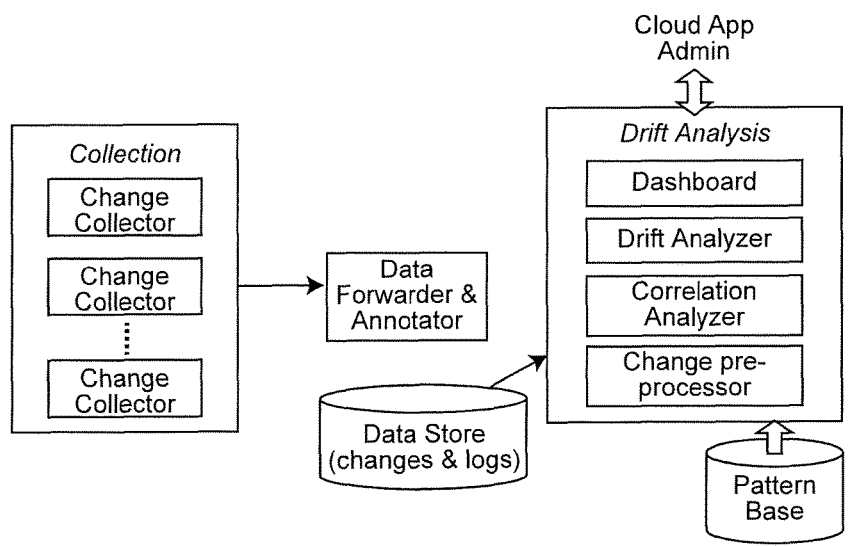
FIG. 12 is a schematic of Proof of Concept System Architecture.

We implemented a Proof-of-Concept (PoC) system based on the IOA-LA[12] and Spark[13] platform. The architecture is shown in FIG. 12. The in-VM and out-of-box Change Collectors are implemented with Java and Shell scripts. The change data and logs are stored into the IOA-LA and queried via the IOA-LA API. The drift analyzer is written in Scala[14] programming language and running on the Spark cluster.

Experiment Settings

We selected a representative web application POT (a.k.a. Portfolio Optimization Tool) developed by IBM® Research as the experiment application. It is implemented as a web application with an ad-hoc configuration file (database.xml) to specify its database access info (e.g. database server IP address, database name, credentials) and a third party dependent component (libcplex101.so) unpackaged into the archive file. In the experiment environment, POT was deployed into a WebSphere® cluster topology shown in FIG. 13.

Figure 13:
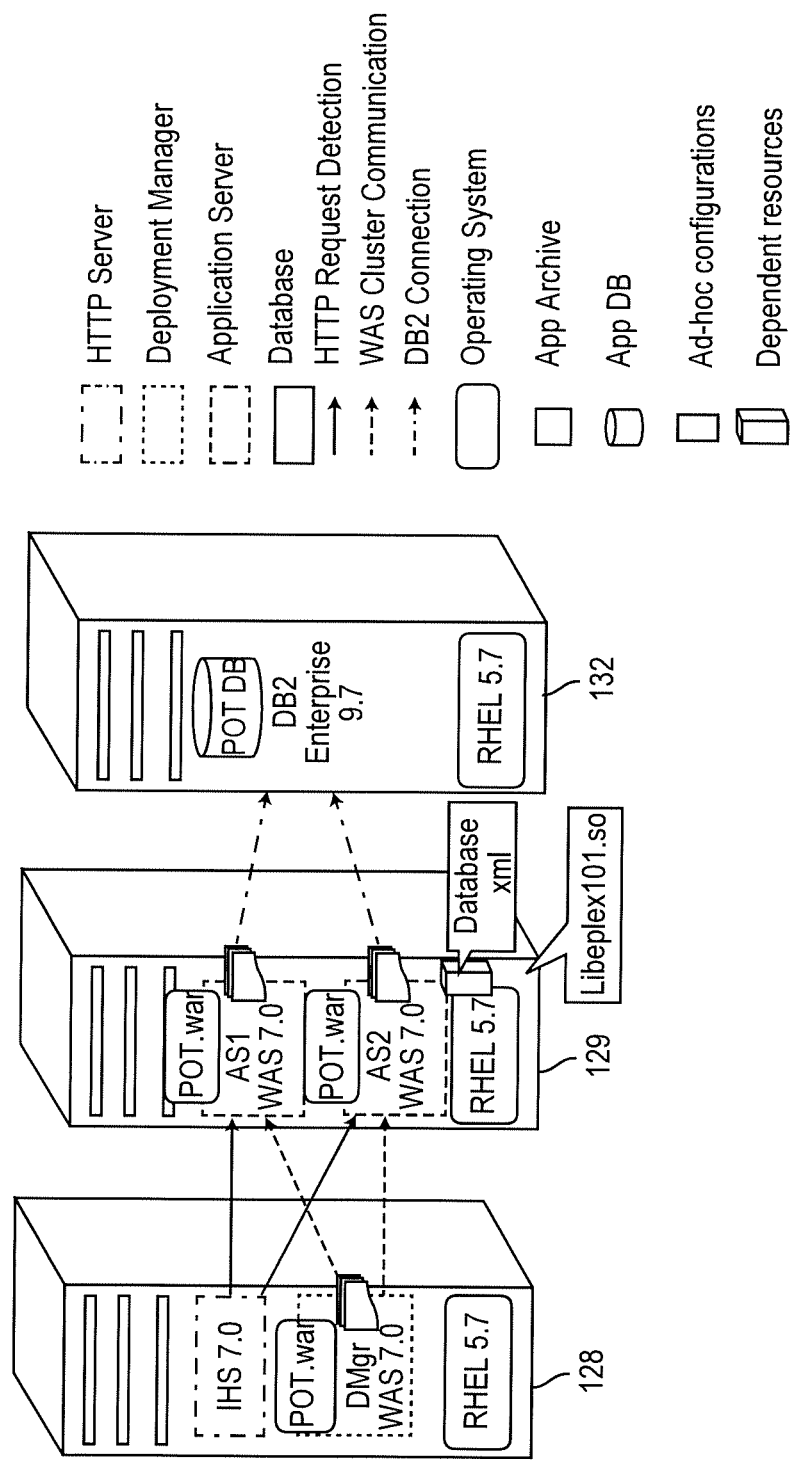
FIG. 13 is a schematic of an experimental application system topology.

In this topology, there are three Virtual Machines (VMs) all running on RHEL 5.7 (identified as the operating system in FIG. 13). The first VM was installed the IBM® HTTP Server 7.0 as the HTTP server identified in FIG. 13 and WAS 7.0 as the deployment manager (DMgr) in FIG. 13 for the cluster. The second VM was installed the WAS 7.0 and deployed two managed application servers (AS1 and AS2) in the cluster (identified as the Application Servers AS1 WAS 7.0 and AS2 WAS 7.0 in FIG. 13). The POT application was installed in the cluster and managed by the DMgr node. The ad-hoc application configuration file (database.xml) and unpackaged third party component (libcplex101.so) were put into the second VM. The third VM was installed the DB2® Enterprise 9.7 (identified as Database in FIG. 13) and hosted the POT database.

Evaluation Approach

We evaluated our approach with the three metrics: the presence, top-10 presence, and top-3 presence. The presence measures the effectiveness of our approach, which is if the drifts can be captured by the change collector. The top-10 presence and top-3 presence measure the efficiency of our drift analytics, which is if our approach can discover the drifts and rank them in the top 10 or 3 of the suspicious drift list.

The presence (P) is defined in the Eq(5).

$$P = \frac{\sum_{i=0}^{n}(f(d_i))}{n} \quad \text{Eq(5)}$$

Where $$f(d_i) = \begin{cases} 1 & d_i \in C \\ 0 & d_i \notin C \end{cases}$$

is the function to indicate if the drift $d_i$ belongs to the total change set C captured by the Change Collector, $d_i$ is the $i^{th}$ drift injected into the system, and n is the total number of injected drifts.

Top-10 presence ($P^{10}$) is defined in the Eq(6).

$$P^{10} = \frac{\sum_{i=0}^{n}(f^{10}(d_i))}{n} \quad \text{Eq(6)}$$

Where $$f^{10}(d_i) = \begin{cases} 1 & d_i \in SC^{10} \\ 0 & d_i \notin SC^{10} \end{cases}$$

is the function to indicate if the drift d belongs to the top 10 suspicious change set $SC^{10}$ recommended by the pattern-based drift discovery.

Top-3 presence ($P^3$) is defined in the Eq(7)

$$P^3 = \frac{\sum_{i=0}^{n}(f^3(d_i))}{n} \quad \text{Eq(7)}$$

Where $$f^3(d_i) = \begin{cases} 1 & d_i \in SC^3 \\ 0 & d_i \notin SC^3 \end{cases}$$

is the function to indicate if the drift $d_i$ belongs to the top 3 suspicious change set $SC^3$ recommended by the pattern-based drift discovery.

Experiments

We designed a set of typical change-induced faults, as shown in the Error! Reference source not found and injected them into the experiment environment. We injected one fault into the environment each time and evaluated our approach with the three measurements we defined above. For each type of faults, we repeated the injections 15 times. In order to reflect the real production environment, we randomly injected the chaos changes into the environment simultaneously.

TABLE IV

Fault Injection

| Object Type | Change Behavior | Fault Type | Symptom | Fault Injection |
|---|---|---|---|---|
| File | Update metadata | File permission update error | Function Broken | Remove read permission of Database.xml Remove the execution permission of libcplex101.so |
| | Update content | File content update error | Function Broken | Inject the format errors & content errors in Database.xml and cell.xml |
| Package | Upgrade | Incompatible package update error | Function Broken | update the JRE version |
| OS | Update | Config update error | Function Broken | Update db2inst1 password and don't update JDBC authentication in application server. |
| Process | Delete | Process stop error | Performance Degradation/ Function Broken | Kill the application server processes, db server process |
| Network | Delete | Network service stop error | Performance Degradation/ Function Broken | Disable the application server ports |
| Utilization | Update | Resource utilization error | Function Broken | Add huge file into the disk |

The evaluation results are shown in the Error! Reference source not found. In all the evaluation cases, the presences are all 1, which validates that our approach is effective to capture all the drifts. The Top-10 presences are above 0.80, which indicates that our analytics capability is efficient to recommend the drifts in the Top-10 list with above 80% probability. The Top-3 presences are above 0.60, which means that the cloud application administrators can catch the drift in over 60% cases. With our approach, the change-induced errors can be captured and identified effectively and efficiently. Therefore, it can dramatically accelerate the diagnosis process and improve the MTTR (Mean-Time-To-Recovery).

TABLE V

Evaluation Results

| Fault Type | Fault Injection | # of drifts in change log | # of drifts 'in Top-1 | # of drifts in Top-3 | P | $P^{10}$ | $P^3$ |
|---|---|---|---|---|---|---|---|
| File permission update error | Remove read permission of Database.xml | 15 | 14 | 10 | 1.00 | 0.93 | 0.67 |
| | Remove the execution permission of libcplex101.so | 15 | 15 | 13 | 1.00 | 1.00 | 0.87 |
| File content update error | Inject the format errors & content errors in Database.xml, Inject the format errors & content errors in cell.xml, update the JRE version | 15 | 15 | 12 | 1.00 | 1.00 | 0.80 |
| | | 15 | 13 | 10 | 1.00 | 0.87 | 0.67 |
| Incompatible package update error | | 15 | 14 | 13 | 1.00 | 0.93 | 0.87 |
| Inconsistent config update error | Update db2inst1 password and don't update JDBC authentication in application server. | 15 | 12 | 10 | 1.00 | 0.80 | 0.67 |
| Process stop error | Kill the application server processes, db server process | 15 | 15 | 9 | 1.00 | 1.00 | 0.60 |
| Network service stop error | Disable the application server ports | 15 | 14 | 13 | 1.00 | 0.93 | 0.87 |

TABLE V-continued

Evaluation Results

| Fault Type | Fault Injection | # of drifts in change log | # of drifts 'in Top-1 | # of drifts in Top-3 | P | $P^{10}$ | $P^3$ |
|---|---|---|---|---|---|---|---|
| Resource utilization error | Add huge file into the disk | 15 | 13 | 12 | 1.00 | 0.87 | 0.80 |

Case Analysis

In order to better illustrate how our PoC system interacts with the users, we take the "File content update error" as the example and analyze it into details. In this case study, we injected a syntax error (deleting ">") into the POT application configuration file "database.xml".

In this case, we set the data collection intervals as 10 minutes for file changes and 2 minutes for the rest types of changes and collected the changes and logs within around two and half hours. During this time period, we collected 10,550 change records from the three VMs in total and 125,244 log entries from the web access logs, WAS application server logs, and DB2® logs, in which includes 6,929 error logs triggered by this injected drift. These data are indexed and stored in the IOA-LA.

Figure 14:
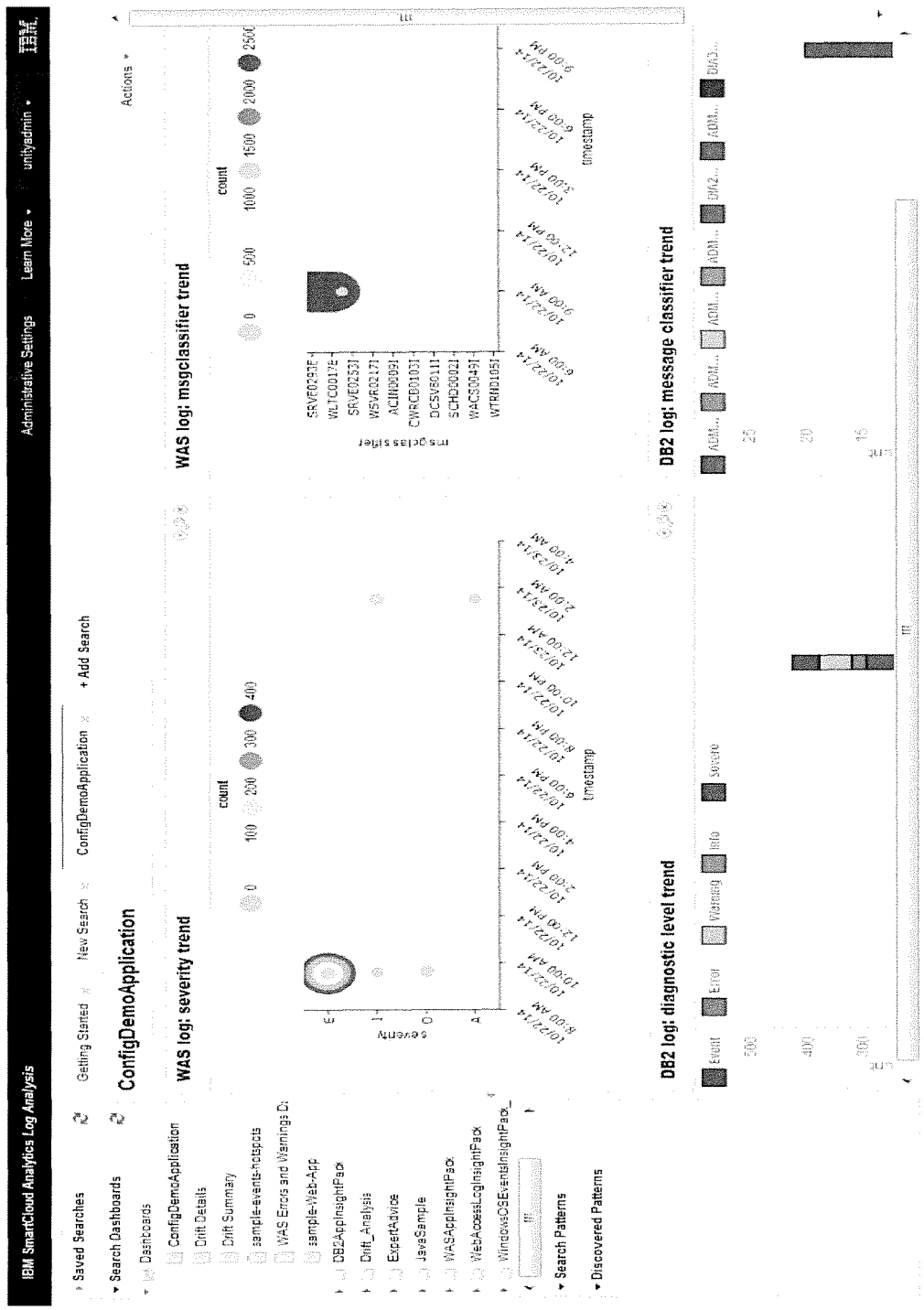
FIG. 14 is an exemplary application health dashboard.
Figure 15:
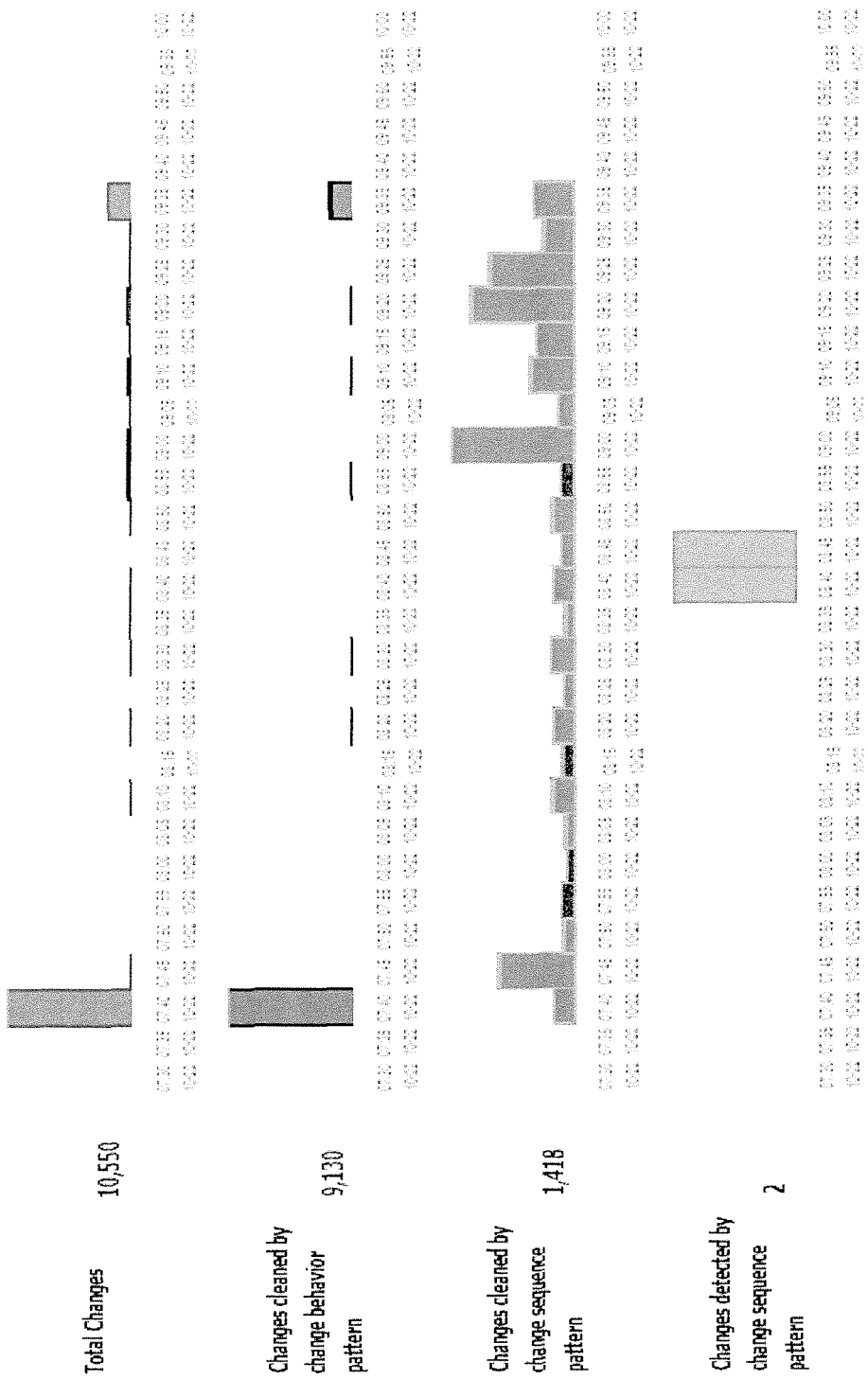
FIG. 15 is a screen showing diagnosis results utilizing the invention.

The application health dashboard as shown in FIG. 14 allows the cloud application admins to understand the application status. From the dashboard, a number of "400" errors were captured. The admin triggered the drift analysis to find out the root cause. By applying the pattern-based approach, these changes and error logs are analyzed and correlated to identify the suspicious drifts. FIG. 15 shows the analyzed results by applying the proposed pattern-based approach. By applying the change behavior and change sequence patterns, 9,130 changes and 1,418 changes are identified as the irrelevant changes, wherein two out of 10,550 changes are recommended as the suspicious drifts.

Figure 16:
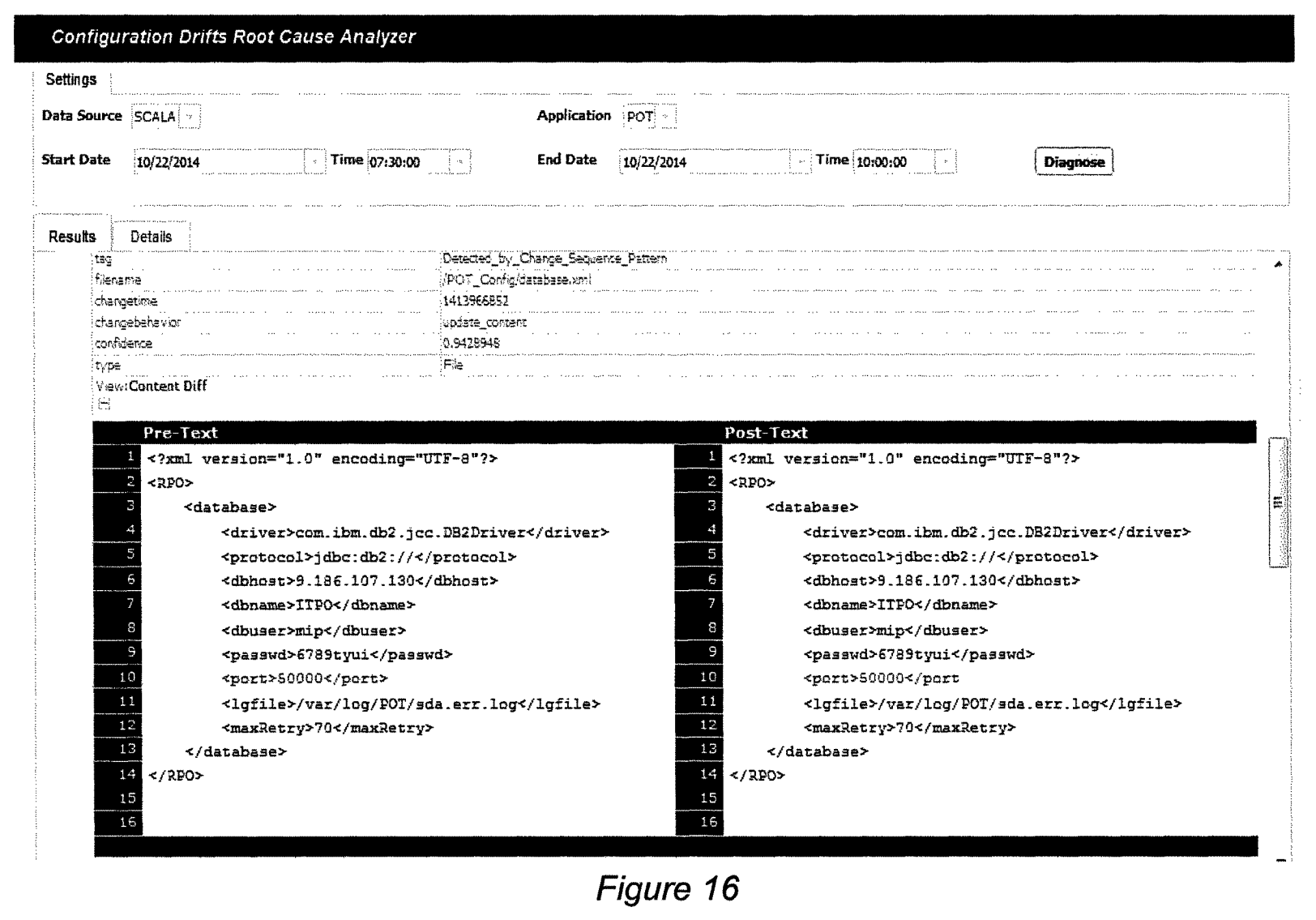

Then, the cloud application admin drilled down to the details of the recommended drifts as shown in FIG. 16. The difference of the file content before and after change were highlighted. The administrator checked the details and found out the syntax error drift caused the application problem. From the experiments and case analysis, our approach has proved to be effective and efficient in identifying the change-induced errors.

As demonstrated in this Example, we present a pattern-based abnormal change analysis approach that captures fine-grained, system level changes and detects suspicious ones for accelerating system troubleshooting. The changes are captured from the major aspects of the targeted system across all levels of software stack using either in-VM or out-of-box approach. Then the data pre-processing, correlation and pattern based discovery are then used to extract and normalize features, clean the irrelevant changes, correlate the changes with the reported errors, and finally discover and rank suspicious changes.

REFERENCES

[1] Martin Fowler, Blue-green Deployment, http://martinfowler.com/bliki/BlueGreenDeployment.html
[2] M. Burgess, "A Site Configuration Engine", USENIX Computing Systems, vol. 8, no. 3, pp. 309-337, 1995
[3] CFEngine, http://cfengine.com
[4] W. Hummer, F. Rosenberg, F. Oliveira, T. Eilam, "Testing idempotence for Infrastructure as Code", ACM/IFIP/USENIX International Middleware Conference, Beijing, China, Dec. 9-13, 2013.
[5] D. Oppenheimer, A. Ganapathi, and D. A. Patterson, "Why do Internet services fail, and what can be done about it?," in Proceedings of the 4th Conference on USENIX Symposium on Internet Technologies and Systems—Volume 4, Seattle, Wash., Mar. 26-28, 2003.
[6] J. A. Redstone, M. M. Swift, B. N. Bershad, Using computers to diagnose computer problems, in: Proc. HotOS, 2003.
[7] Y. M. Wang, C. Verbowski, John Dunagana, Yu Chen, H. J. Wang, Chun Yuan, Zheng Zhang, STRIDER: A Black-box, State-based Approach to Change and Configuration Management and Support, Volume 53, Issue 2, November 2004, Pages 143-164, Topics in System Administration, Science of Computer Programming
[8] Christopher Gates, Ninghui Li, Zenglin Xu, Suresh N. Chari, Ian Molloy, Youngja Park, Detecting Insider Information Theft using Features from File Access Logs, Volume 8713 of the series Lecture Notes in Computer Science pp 383-400, Computer Security—ESORICS 2014
[9] S. Suneja, C. Isci, V. Bala, E. de Lara, T. Mummert, Non-intrusive, Out-of-band and Out-of-the-box Systems Monitoring in the Cloud, SIGMETRICS 2014
[10] LibVMI, http://libvmi.com/
[11] Rekall, http://www.rekall-forensic.com/
[12] IBM Operations Analytics Log Analytics, http://www.ibm.com
[13] Apache Spark, http://spark.apache.org/
[14] Scala, http://www.scala-lang.org/

While the invention has been described in terms of various embodiments, those skilled in the art will recognize that the invention can be practiced with modification within the spirit and scope of the appended claims.

Having thus described our invention, what we claim as new and desire to secure by Letters Patent is as follows:

1. A computer implemented method for resolving a computer configuration or system state drift by reducing diagnosis scope from a large set of change records to a smaller set of change records in computer based systems, comprising:
  cleaning irrelevant changes from said large set of change records based on domain independent rules applied by one or more computers against said large set of change records to produce a cleaned set of change records;
  extracting and normalizing features of change records in said cleaned set of change records;
  removing records from said cleaned set of change records based on change patterns of said extracted and normalized features, wherein the change records comprise change data which affect configuration and system state drifts;
  clustering remaining change records into smaller clusters;
  identifying at least one change record from the clusters as a source of drift; and
  resolving the drift by correcting a change associated with the at least one change record identified as the source of drift,
  wherein the change records comprise change data involving one or more of changes in configuration and system files, operating system (OS) configuration changes, changes to network services, and changes to file systems.

2. The computer implemented method of claim 1 wherein the large set of change records includes change sequences and error sequences, and further comprising the steps of
    determining a temporal correlation between change sequences and error sequences;
    identifying a refined diagnosis window within a specified diagnosis window based on the temporal correlation; and
    removing changes from the cleaned set of change records which are outside of said refined diagnosis window.

3. The computer implemented method of claim 1 wherein said step of removing records includes the step of applying correlation and sequence pattern analysis to one or more change sequences in said cleaned set of change records.

4. The computer implemented method of claim 1 wherein said step of removing records includes identification of one or more of change density and change frequency for change sequences in said cleaned set of change records.

5. The computer implemented method of claim 1 wherein said step of removing records includes each of identification of each of change density, change frequency, and a distance against errors change sequences in said cleaned set of change records.

6. The computer implemented method of claim 1 wherein said step of removing includes using change behavior patterns.

7. The computer implemented method of claim 1 further comprising the step of annotating the change records after extracting and normalizing features for removal or analysis.

8. The computer implemented method of claim 1 further comprising the steps of
    inputting the large set of change records into one or more computers; and
    outputting from said one or more computers a downsized set of change records after performing said steps of cleaning, extracting, removing, and clustering.

9. The computer implemented method of claim 1, wherein the change records further comprise change data involving one or more package changes selected from installation, configuration, uninstalls, and upgrades.

10. A non-transient computer readable medium, encoded with instructions for performing using one or more computers the process of:
    cleaning irrelevant changes from a large set of change records based on domain independent rules applied by said one or more computers against said large set of change records to produce a cleaned set of change records;
    extracting and normalizing features of change records in said cleaned set of change records;
    removing records from said cleaned set of change records based on change patterns of said extracted and normalized features, wherein the change records comprise change data which affect configuration and system state drifts;
    clustering remaining change records into smaller clusters;
    identifying at least one change record from the clusters as a source of drift; and
    resolving the drift by correcting a change associated with the at least one change record identified as the source of drift,
    wherein the change records comprise change data involving one or more of changes in configuration and system files, operating system (OS) configuration changes, changes to network services, and changes to file systems.

11. The non-transient computer readable medium of claim 10 wherein the large set of change records includes change sequences and error sequences, and further comprising encoded instructions for performing the steps of
    determining a temporal correlation between change sequences and error sequences;
    identifying a refined diagnosis window within a specified diagnosis window based on the temporal correlation; and
    removing changes from the cleaned set of change records which are outside of said refined diagnosis window.

12. The non-transient computer readable medium of claim 10 wherein instructions for said step of removing records includes instructions for applying correlation and sequence pattern analysis to one or more change sequences in said cleaned set of change records.

13. The non-transient computer readable medium of claim 10 wherein instructions for said step of removing records includes instructions for identifying of one or more of change density and change frequency for change sequences in said cleaned set of change records.

14. The non-transient computer readable medium of claim 10 wherein instructions for said step of removing records includes instructions for each of identifying each of change density, change frequency, and a distance against errors change sequences in said cleaned set of change records.

15. The non-transient computer readable medium of claim 10 wherein instructions for said step of removing includes instructions for using change behavior patterns.

16. The non-transient computer readable medium of claim 10 further comprising instructions for the step of annotating the change records after extracting and normalizing features for removal or analysis.

17. The non-transient computer readable medium of claim 10, wherein the change records further comprise change data involving one or more package changes selected from installation, configuration, uninstalls, and upgrades.

18. A computerized system for resolving a computer configuration or system state drift by reducing a diagnosis scope from a large set of change records to a smaller set of change records in computer based systems, comprising:
    one or more computers configured for receiving said large set of change records as input;
    a cleaning module for cleaning irrelevant changes from said large set of change records based on domain independent rules applied by said one or more computers against said large set of change records to produce a cleaned set of change records;
    an extraction and normalization module for extracting and normalizing features of change records in said cleaned set of change records;
    a removal module for removing records from said cleaned set of change records based on change patterns of said extracted and normalized features, wherein the change records comprise change data which affect configuration and system state drifts;
    a clustering module for clustering remaining change records into smaller clusters;
    wherein the one or more computers are configured for
        identifying at least one change record from the clusters as a source of drift; and
        resolving the drift by correcting a change associated with the at least one change record identified as the source of drift,
        wherein the change records comprise change data involving one or more of changes in configuration and system files, operating system (OS) configuration changes, changes to network services, and changes to file systems.

19. The system of claim 18, further comprising an annotator annotating the change records after extracting and normalizing features for removal or analysis.

20. The system of claim 18, wherein the change records further comprise change data involving one or more package changes selected from installation, configuration, uninstalls, and upgrades.

* * * * *